(12) United States Patent
Wang et al.

(10) Patent No.: US 12,384,056 B2
(45) Date of Patent: Aug. 12, 2025

(54) ROBOT JOINT HAVING DYNAMIC SEALING STRUCTURE AND QUADRUPED ROBOT APPLYING THE SAME

(71) Applicant: HangZhou YuShu TECHNOLOGY CO., LTD., Hangzhou (CN)

(72) Inventors: Xingxing Wang, Hangzhou (CN); Zhiyu Yang, Hangzhou (CN)

(73) Assignee: HANGZHOU YUSHU TECHNOLOGY CO., LTD., Hangzhou (CN)

(*) Notice: Subject to any disclaimer, the term of this patent is extended or adjusted under 35 U.S.C. 154(b) by 171 days.

(21) Appl. No.: 18/269,444

(22) PCT Filed: Nov. 30, 2021

(86) PCT No.: PCT/CN2021/134226
§ 371 (c)(1),
(2) Date: Jun. 23, 2023

(87) PCT Pub. No.: WO2022/135077
PCT Pub. Date: Jun. 30, 2022

(65) Prior Publication Data
US 2024/0042627 A1 Feb. 8, 2024

(30) Foreign Application Priority Data
Dec. 25, 2020 (CN) .......................... 202023195286.3

(51) Int. Cl.
*B25J 17/00* (2006.01)
*B25J 19/00* (2006.01)
*F16J 15/3284* (2016.01)

(52) U.S. Cl.
CPC ........... *B25J 17/00* (2013.01); *B25J 19/0075* (2013.01); *F16J 15/3284* (2013.01)

(58) Field of Classification Search
CPC .... F16H 1/32; F16H 2001/327; F16H 57/023; F16H 57/082; F16H 2001/2881;
(Continued)

(56) References Cited

U.S. PATENT DOCUMENTS 6,547,250 B1* 4/2003 Noble .................... F16J 15/164
277/471

FOREIGN PATENT DOCUMENTS

| CN | 103231751 A | 8/2013 |
| CN | 106224517 A | 12/2016 |

(Continued)

OTHER PUBLICATIONS

English Translation of Nakamura JP 2009085267 (Year: 2009).*

*Primary Examiner* — Victor L MacArthur
(74) *Attorney, Agent, or Firm* — Muncy, Geissler, Olds & Lowe, P.C.

(57) ABSTRACT

A robot joint having a dynamic sealing structure includes a power unit housing and an output shaft rotatable relative to the power unit housing. A soft and hard combined composite sealing ring is provided between the power unit housing and the output shaft. A soft first sealing ring is tightly connected with a joint to effectively seal the rotating joint. A hard second sealing ring slides relative to the joint while sealing the joint, thus reducing the obstruction to the movement of the joint. A quadruped robot applies the robot joint having the dynamic sealing structure. The two sealing rings with different hardness butt against each other to form a dynamic sealing structure used for sealing the joint and capable of maintaining the normal movement of the joint, effectively preventing rainwater, dust and the like from entering the joint, thus protecting the joint of the robot.

16 Claims, 3 Drawing Sheets

(58) Field of Classification Search
CPC .. F16H 57/029; F16H 57/045; F16H 57/0463; F16H 57/0479; F16H 57/0486; H02K 7/116; B25J 17/00; B25J 19/0075; F16J 15/3284; F16J 15/3496; F16J 15/344; B62D 57/032
See application file for complete search history.

(56) References Cited

FOREIGN PATENT DOCUMENTS

| | | |
|---|---|---|
| CN | 208816677 U | 5/2019 |
| CN | 212028523 U | 11/2020 |
| CN | 214138753 U | 9/2021 |
| JP | 2009085267 A * | 4/2009 |

* cited by examiner

ROBOT JOINT HAVING DYNAMIC SEALING STRUCTURE AND QUADRUPED ROBOT APPLYING THE SAME

TECHNICAL FIELD

The present utility model relates to the technical field of robot devices, in particular to a robot joint having a dynamic sealing structure and a quadruped robot applying the same.

BACKGROUND

At present, robots can replace humans to perform tasks such as security inspection, and field rescue and exploration. When performing these tasks, robots inevitably encounter harsh environments with dust, rainwater, etc. In this case, dust and rainwater may easily enter the joints of the robots, causing joint wear and even inability to work properly.

SUMMARY

Technical Problem

If the existing sealing ring is directly assembled, the frictional resistance is large and the service life is short, which will affect the normal movement of the joint. Therefore, there is an urgent need for a joint sealing structure for robots to effectively prevent dust or rainwater from entering the joints from the external environment, without affecting the normal movement of the joints.

Solution to the Problem

Technical Solution

In order to overcome the shortcomings of the existing technology, a first purpose of the present utility model is to provide a robot joint, which is provided with a soft and hard combined composite seal ring. Two sealing rings with different hardness butt against each other to form a joint dynamic sealing structure used for sealing a joint and capable of maintaining the normal movement of the joint, which has the beneficial effects of small sliding friction, adaptability to the use wear of the sealing ring and strong tolerance to joint load change, effectively preventing rainwater, dust and the like from entering the joint, thus protecting the joint of the robot.

A second purpose of the present utility model is to provide a quadruped robot provided with a dynamic sealing structure at a joint, which can effectively prevent rainwater, dust and the like from entering the joint, thus protecting the joint of the quadruped robot.

In order to achieve the first purpose, the present utility model adopts the following first technical solution:

A robot joint having a dynamic sealing structure, wherein the robot joint having the dynamic sealing structure includes a power unit housing and an output shaft rotatable relative to the power unit housing; a dynamic sealing component is provided between the power unit housing and the output shaft;

the dynamic sealing component includes a first sealing ring and a second sealing ring butting against each other and capable of maintaining relatively stationary and sealed;

the friction coefficient of the first sealing ring is greater than the friction coefficient of the second sealing ring; the second sealing ring has a higher structural strength than the first sealing ring; since the friction of the second sealing ring is small, the wear is small;

one of the power unit housing and the output shaft directly or indirectly butts against the first sealing ring, and the other is in direct or indirect sliding contact with the second sealing ring;

the first sealing ring is deformed after squeezed to produce a pre-tightening force, causing the dynamic sealing component to directly or indirectly butt against the power unit housing and the output shaft respectively to form the dynamic sealing structure used for sealing a joint and capable of maintaining the normal movement of the joint. The user wear of the second sealing ring is adapted, and the tolerance to joint load change is strong.

After continuous exploration and experimentation, in the present utility model, a soft and hard combined composite sealing ring is provided. A soft first sealing ring can be tightly connected with the joint, thus effectively sealing the rotating joint. A hard second sealing ring can slide relative to the joint while sealing the joint, thus reducing obstruction to the movement of the joint. The solution is simple, practical and ingenious. By providing two sealing rings with different hardness which butt against each other to form a dynamic sealing structure used for sealing the joint and capable of maintaining the normal movement of the joint, the present utility model can effectively prevent rainwater, dust and the like from entering the joint, thus protecting the joint of the robot.

As an exemplary technical measure,
the first sealing ring is made of an elastic material, including but not limited to rubber or silica gel; the material of the second sealing ring includes but not limited to ceramics, plastics or metals. The manufacturing cost is low, and the popularization and use are facilitated.

As an exemplary technical measure,
the robot joint further includes a gland, the gland is fixed on a side surface of the power unit housing close to the output shaft, and the second sealing ring tightly and slidably butts against the power unit housing, the gland or the output shaft under the squeezing of the first sealing ring.

As an exemplary technical measure,
one side of the second sealing ring butting against the power unit housing, the gland or the output shaft is provided with an annular groove, and lubricating oil is contained in the annular groove.

In the present utility model, on the one hand, the provided annular groove can be used for containing lubricating oil, thus reducing the frictional resistance caused by the second sealing ring during rotation, reducing the obstruction to the rotation of the joint component, and achieving a good waterproof effect. On the other hand, the provided annular groove can leave more deformation space for the second sealing ring, making it more tightly fit with the gland or the output shaft, and achieving a better waterproof effect.

As an exemplary technical measure,
a third sealing ring is provided between the gland and the power unit housing, so as to further improve the waterproof and dustproof effect.

A junction of the output shaft, the gland and the power unit housing is provided with a dustproof layer. The provided dustproof layer can prevent dust, stones and the like from entering the joint through the gap, especially between the gland and the output shaft which rotate relative to each other, and causing wear to the components in the joint.

As an exemplary technical measure, the robot joint further includes a joint connector, the joint connector is fixedly connected with the output shaft, and a fourth sealing ring is provided between the joint connector and the output shaft, so as to further improve the waterproof and dustproof effect.

As an exemplary technical measure, a side part of the power unit housing is fixedly provided with an end cover, and a fifth sealing ring is provided between the power unit housing and the end cover. The connection between the end cover and the power unit housing is directly communicated with the inside of a power unit. The provided fifth sealing ring can prevent external dust, rainwater and the like from entering the power unit.

In order to achieve the first purpose, the present utility model adopts the following second technical solution:

A robot joint having a dynamic sealing structure, wherein a dynamic sealing component is provided;
the dynamic sealing component includes a first sealing ring and a second sealing ring;
the friction coefficient of the first sealing ring is greater than the friction coefficient of the second sealing ring;
the second sealing ring has a higher structural strength than the first sealing ring;
the first sealing ring is deformed after squeezed to form the dynamic sealing structure used for sealing a joint and capable of maintaining the normal movement of the joint.

After continuous exploration and experimentation, by providing two sealing rings with different hardness which butt against each other to form a dynamic sealing structure used for sealing the joint and capable of maintaining the normal movement of the joint, the present utility model can effectively prevent rainwater, dust and the like from entering the joint, thus protecting the joint of the robot.

Further, in the present utility mode, a soft and hard combined composite sealing ring is provided. A soft first sealing ring is capable of being tightly connected with a joint to effectively seal the rotating joint. A hard second sealing ring is capable of sliding relative to the joint while sealing the joint, thus reducing the obstruction to the movement of the joint. The solution is simple, practical and ingenious.

As an exemplary technical measure, the robot joint having the dynamic sealing structure further includes a power unit housing and an output shaft rotatable relative to the power unit housing; the dynamic sealing component is provided between the power unit housing and the output shaft;
one of the power unit housing and the output shaft directly or indirectly butts against the first sealing ring, and the other is in direct or indirect sliding contact with the second sealing ring;
the first sealing ring is deformed after squeezed to produce a pre-tightening force, causing the dynamic sealing component to directly or indirectly butt against the power unit housing and the output shaft respectively.

The present utility model has the beneficial effects that the structure is simple, practical and convenient to implement, and the manufacturing cost is low.

In order to achieve the second purpose, the present utility model adopts the following technical solution:

A quadruped robot, wherein the quadruped robot includes the robot joint having the dynamic sealing structure.

In the quadruped robot provided in the present utility model, the dynamic sealing structure is provided at the joint. By provided the dynamic sealing component between the power unit housing and the output shaft which rotate relative to each other, rainwater, dust and the like in the external environment are effectively prevented from entering the power unit through the gap in the rotation position and causing wear and even damage to the power unit. The structure is simple, practical and ingenious.

Beneficial Effects of the Utility Model

Beneficial Effects

After continuous exploration and experimentation, a soft and hard combined composite sealing ring is provided. Two sealing rings with different hardness butt against each other to form a joint dynamic sealing structure used for sealing a joint and capable of maintaining the normal movement of the joint, which has the beneficial effects of small sliding friction, adaptability to the use wear of the sealing ring and strong tolerance to joint load change, effectively preventing rainwater, dust and the like in the external environment from entering the power unit from the gap in the rotation position and causing wear and even damage to the power unit, thus protecting the joint of the robot.

Further, in the quadruped robot provided in the present utility model, the dynamic sealing structure is provided at the joint. By provided the dynamic sealing component between the power unit housing and the output shaft which rotate relative to each other, the sliding friction is small, the use wear of the sealing ring is adapted and the tolerance to joint load change is strong, effectively preventing rainwater, dust and the like in the external environment from entering the power unit from the gap in the rotation position and causing wear and even damage to the power unit. The structure is simple, practical and ingenious.

BRIEF DESCRIPTION OF THE DRAWINGS

Description of the Drawings

Figure 1:
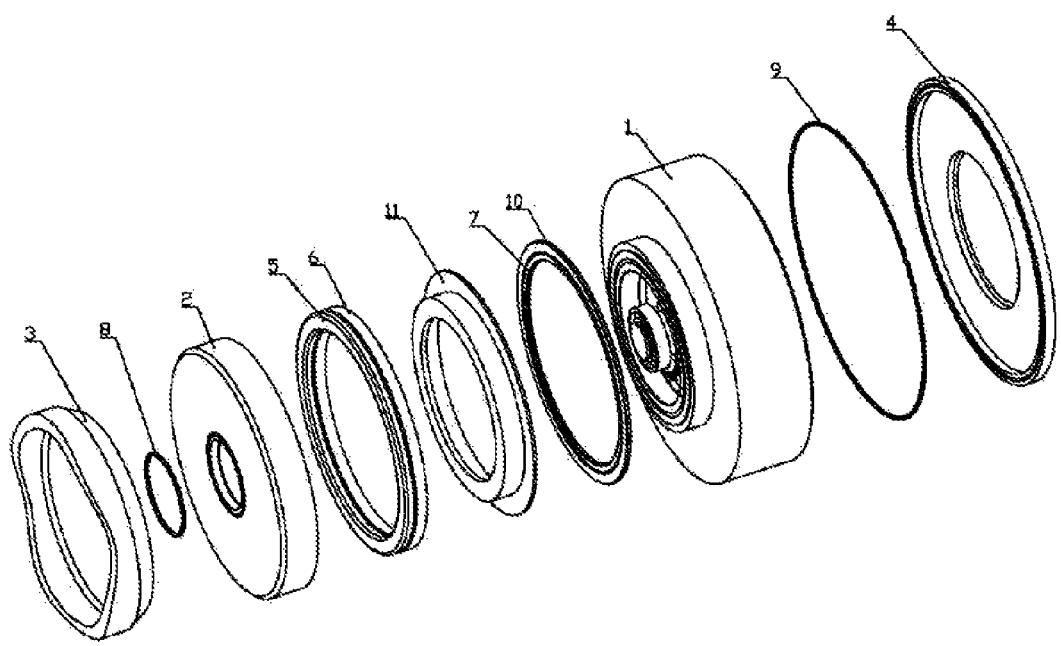

FIG. 1 illustrates an exploded view according to the present utility model.

Figure 2:
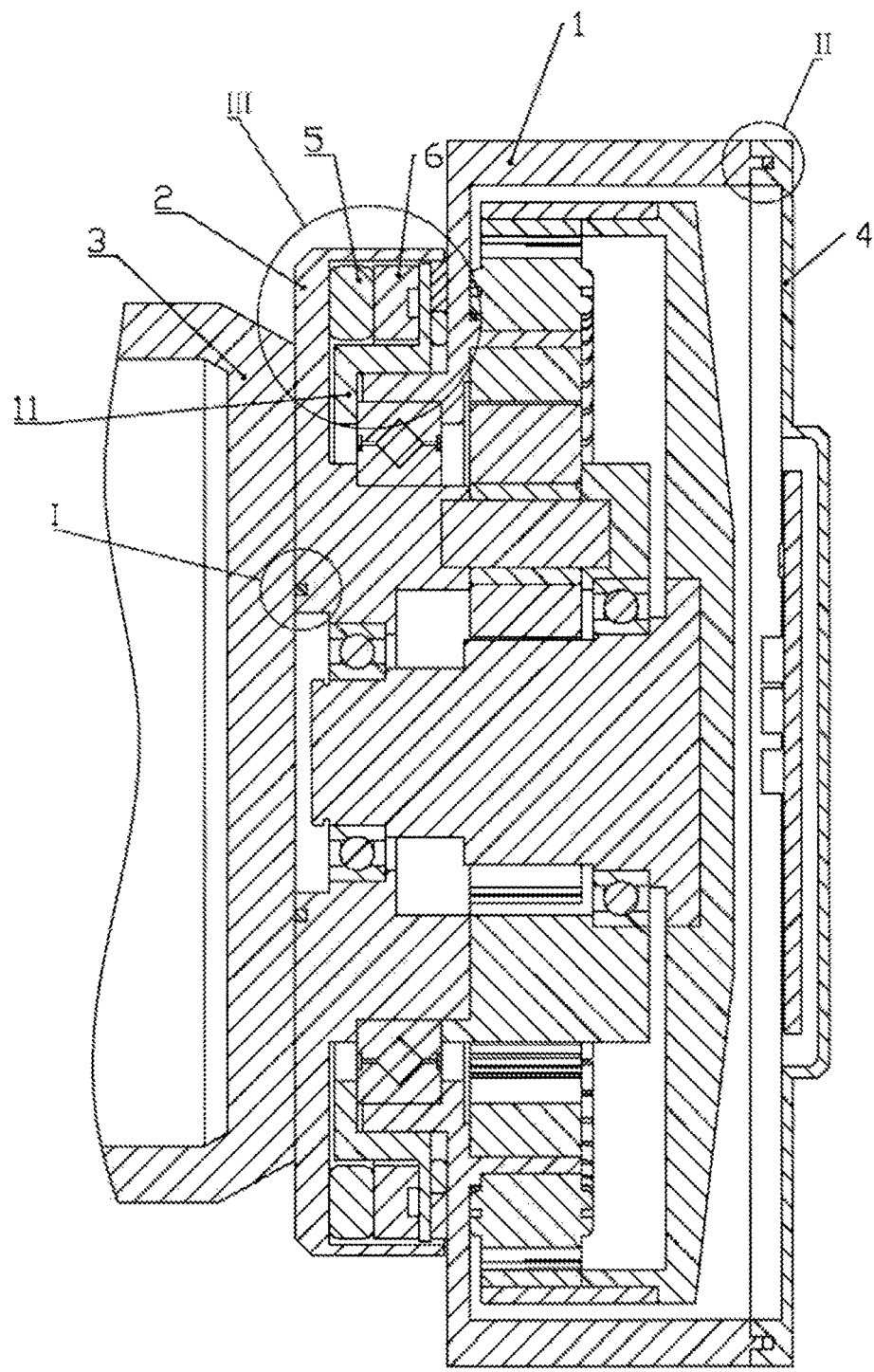

FIG. 2 illustrates an all sectional view according to the present utility model.

Figure 3:
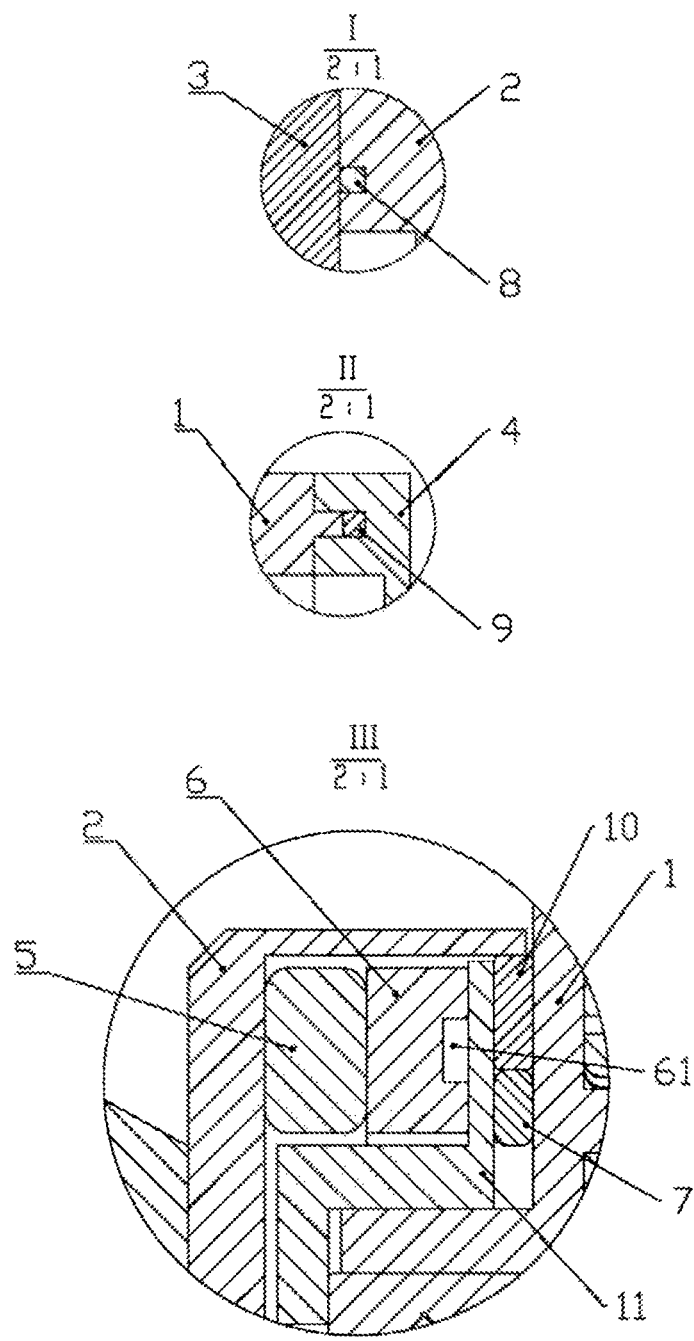

FIG. 3 illustrates a partial enlarged view according to the present utility model.

In the drawings, 1—power unit housing; 11—gland; 2—output shaft; 3—joint connector; 4—end cover; 5—first sealing ring; 6—second sealing ring; 61—annular groove; 7—third sealing ring; 8—fourth sealing ring; 9—fifth sealing ring; 10—dustproof layer.

DETAILED DESCRIPTION OF THE EMBODIMENTS

Description of the Embodiments

Below, the present utility model will be further described in combination with the specific embodiments with reference to the drawings. It is to be understood that the various embodiments or technical features described below may be freely combined to form new embodiments without causing any conflict.

Unless otherwise defined, all technical and scientific terms used herein have the same meanings as those commonly understood by technical personnel in the field of the present utility model. The terms used herein are only for the purpose of describing the specific embodiments and are not intended to limit the present utility model.

Referring to FIG. 1-3, a robot joint having a dynamic sealing structure includes a power unit housing 1 and an output shaft 2 rotatable relative to the power unit housing 1. A dynamic sealing component is provided between the power unit housing 1 and the output shaft 2.

The dynamic sealing component includes a first sealing ring 5 and a second sealing ring 6 butting against each other and capable of maintaining relatively stationary and sealed.

The friction coefficient of the first sealing ring 5 is greater than the friction coefficient of the second sealing ring 6. The second sealing ring 6 has a higher structural strength than the first sealing ring 5.

One of the power unit housing 1 and the output shaft 2 directly or indirectly butts against the first sealing ring 5. The other is in direct or indirect sliding contact with the second sealing ring 6.

The first sealing ring 5 is deformed after squeezed to produce a pre-tightening force, causing the dynamic sealing component to directly or indirectly butt against the power unit housing 1 and the output shaft 2 respectively to form the dynamic sealing structure used for sealing a joint and capable of maintaining the normal movement of the joint.

After continuous exploration and experimentation, in the present utility model, a soft and hard combined composite sealing ring is provided. A soft first sealing ring 5 can be tightly connected with the joint, thus effectively sealing the rotating joint. A hard second sealing ring 6 can slide relative to the joint while sealing the joint, thus reducing obstruction to the movement of the joint. The solution is simple, practical and ingenious. By providing two sealing rings with different hardness which butt against each other to form a dynamic sealing structure used for sealing the joint and capable of maintaining the normal movement of the joint, the present utility model can effectively prevent rainwater, dust and the like from entering the joint, thus protecting the joint of the robot.

Specific Embodiment of Materials of Sealing Rings According to the Present Utility Model The first sealing ring 5 is made of an elastic material, including but not limited to rubber or silica gel. The material of the second sealing ring 6 includes but not limited to ceramics, plastics or metals. The manufacturing cost is low, and the popularization and use are facilitated.

Specific Embodiment of Structure of Gland 11 According to the Present Utility Model The robot joint further includes a gland 11. The gland 11 is fixed on a side surface of the power unit housing 1 close to the output shaft 2. The second sealing ring 6 tightly and slidably butts against the power unit housing 1, the gland 11 or the output shaft 2 under the squeezing of the first sealing ring 5.

Specific Embodiment of Additionally Provided Annular Groove 61 According to the Present Utility Model One side of the second sealing ring 6 butting against the power unit housing 1, the gland 11 or the output shaft 2 is provided with an annular groove 61. Lubricating oil is contained in the annular groove 61.

In the present utility model, on the one hand, the provided annular groove 61 can be used for containing lubricating oil, thus reducing the frictional resistance caused by the second sealing ring 6 during rotation, reducing the obstruction to the rotation of the joint component, and achieving a good waterproof effect. On the other hand, the provided annular groove 61 can leave more deformation space for the second sealing ring, making it more tightly fit with the gland 11 or the output shaft 2, and achieving a better waterproof effect.

Specific Embodiment of Additionally Provided Third Sealing Ring 7 According to the Present Utility Model A third sealing ring 7 is provided between the gland 11 and the power unit housing 1, so as to further improve the waterproof and dustproof effect.

A junction of the output shaft 2, the gland 11 and the power unit housing 1 is provided with a dustproof layer 10. The provided dustproof layer 10 can prevent dust, stones and the like from entering the joint through the gap, especially between the gland 11 and the output shaft 2 which rotate relative to each other, and causing wear to the components in the joint.

Specific Embodiment of Additionally Provided Fourth Sealing Ring 8 According to the Present Utility Model The robot joint further includes a joint connector 3, the joint connector 3 is fixedly connected with the output shaft 2, a fourth sealing ring 8 is provided between the joint connector 3 and the output shaft 2, so as to further improve the waterproof and dustproof effect.

Specific Embodiment of Additionally Provided Fifth Sealing Ring 8 According to the Present Utility Model Aside part of the power unit housing 1 is fixedly provided with an end cover 4. A fifth sealing ring 9 is provided between the power unit housing 1 and the end cover 4. The connection between the end cover 4 and the power unit housing 1 is directly communicated with the inside of a power unit. The fifth sealing ring 9 provided here can prevent external dust, rainwater and the like from entering the power unit.

Embodiment of Application of Robot Joint Having Dynamic Sealing Structure According to the Present Utility Model A quadruped robot includes the robot joint having the dynamic sealing structure.

The above embodiments are only exemplary embodiments of the present utility model and are not intended to limit the scope of protection of the present utility model. Any non-substantive changes and replacements made by those skilled in the art on the basis of the present utility model fall within the scope of protection of the present utility model.

The invention claimed is:

1. A robot joint comprising:
a power unit housing including a top surface;
an output shaft rotatable relative to the power unit housing, the output shaft including a tubular wall and a circular end plate attached to the tubular wall to close an opening of the tubular wall, the circular end plate being parallel with the top surface of the power unit housing, the circular end plate of the output shaft and the top surface of the power unit being perpendicular to a rotational axis of the output shaft; and
a dynamic sealing component provided between the power unit housing and the output shaft, wherein
the dynamic sealing component comprises a first sealing ring and a second sealing ring abutting against each other and capable of maintaining relatively stationary and sealed;
the friction coefficient of the first sealing ring is greater than the friction coefficient of the second sealing ring; the second sealing ring has a higher structural strength than the first sealing ring;
one of the power unit housing and the output shaft directly or indirectly abuts against the first sealing ring, and the other is in direct or indirect sliding contact with the second sealing ring;
the first sealing ring is deformed after being squeezed to produce a pre-tightening force, causing the dynamic sealing component to directly or indirectly abut against the power unit housing and the output shaft respectively to form the dynamic sealing structure used for sealing a joint and capable of maintaining the normal movement of the joint; and the first sealing ring and the second sealing ring are disposed in a space inside the cylindrical wall of the output shaft and parallel with the rotational axis of the output shaft.

2. The robot joint according to claim 1, wherein the first sealing ring is made of an elastic material; the material of the second sealing ring includes ceramics, plastics or metals.

3. The robot joint according to claim 2, wherein the robot joint further comprises a gland, the gland is fixed on a side surface of the power unit housing close to the output shaft, and the second sealing ring tightly and slidably abuts against the power unit housing, the gland or the output shaft under squeezing of the first sealing ring.

4. The robot joint according to claim 3, wherein one side of the second sealing ring, which abuts against the power unit housing, the gland or the output shaft, is provided with an annular groove, and lubricating oil is contained in the annular groove.

5. The robot joint according to claim 4, wherein a third sealing ring is provided between the gland and the power unit housing.

6. The robot joint according to claim 5, wherein the robot joint further comprises a joint connector, the joint connector is fixedly connected with the output shaft, and a fourth sealing ring is provided between the joint connector and the output shaft.

7. The robot joint according to claim 6, wherein a side part of the power unit housing is fixedly provided with an end cover, and a fifth sealing ring is provided between the power unit housing and the end cover.

8. The robot joint according to claim 4, wherein the robot joint further comprises a joint connector, the joint connector is fixedly connected with the output shaft, and a fourth sealing ring is provided between the joint connector and the output shaft.

9. The robot joint according to claim 8, wherein a side part of the power unit housing is fixedly provided with an end cover, and a fifth sealing ring is provided between the power unit housing and the end cover.

10. The robot joint according to claim 3, wherein the robot joint further comprises a joint connector, the joint connector is fixedly connected with the output shaft, and a fourth sealing ring is provided between the joint connector and the output shaft.

11. The robot joint according to claim 10, wherein a side part of the power unit housing is fixedly provided with an end cover, and a fifth sealing ring is provided between the power unit housing and the end cover.

12. The robot joint according to claim 2, wherein the robot joint further comprises a joint connector, the joint connector is fixedly connected with the output shaft, and a fourth sealing ring is provided between the joint connector and the output shaft.

13. The robot joint according to claim 12, wherein a side part of the power unit housing is fixedly provided with an end cover, and a fifth sealing ring is provided between the power unit housing and the end cover.

14. The robot joint according to claim 2, wherein the elastic material is rubber or silica gel.

15. The robot joint according to claim 1, wherein the robot joint further comprises a joint connector, the joint connector is fixedly connected with the output shaft, and a fourth sealing ring is provided between the joint connector and the output shaft.

16. The robot joint according to claim 15, wherein a side part of the power unit housing is fixedly provided with an end cover, and a fifth sealing ring is provided between the power unit housing and the end cover.

* * * * *